Dec. 9, 1941.   W. B. THOMPSON   2,265,209
TOOL OR APPARATUS FOR APPLYING PROTECTIVE COATING
Filed April 3, 1934   2 Sheets-Sheet 1
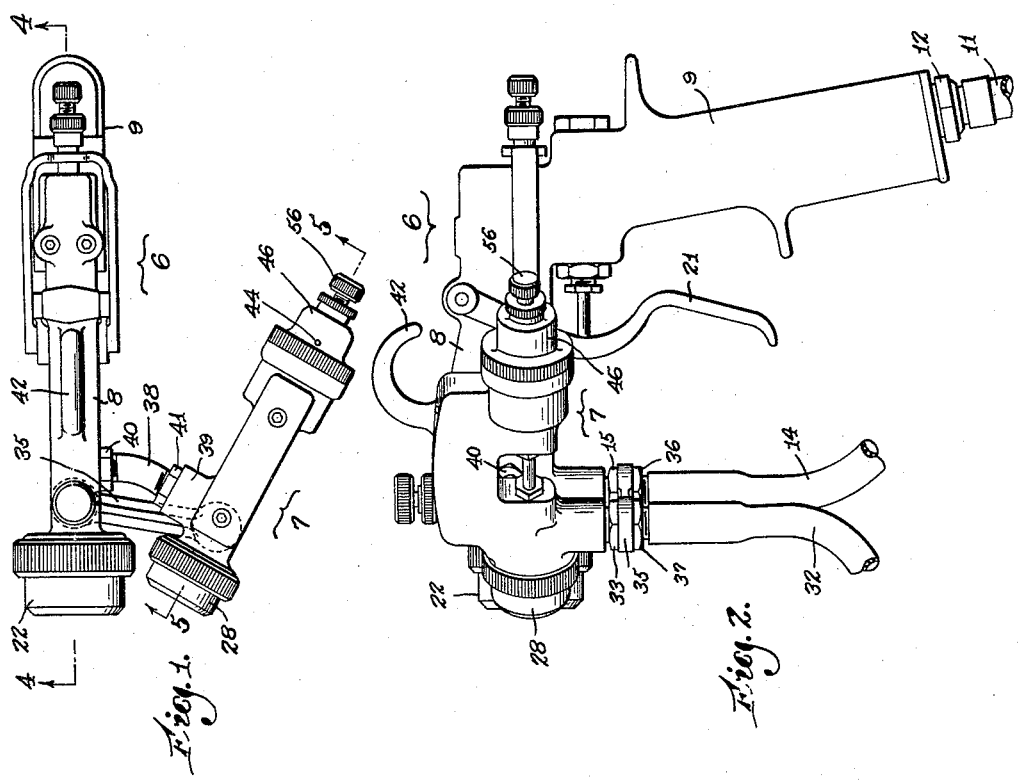
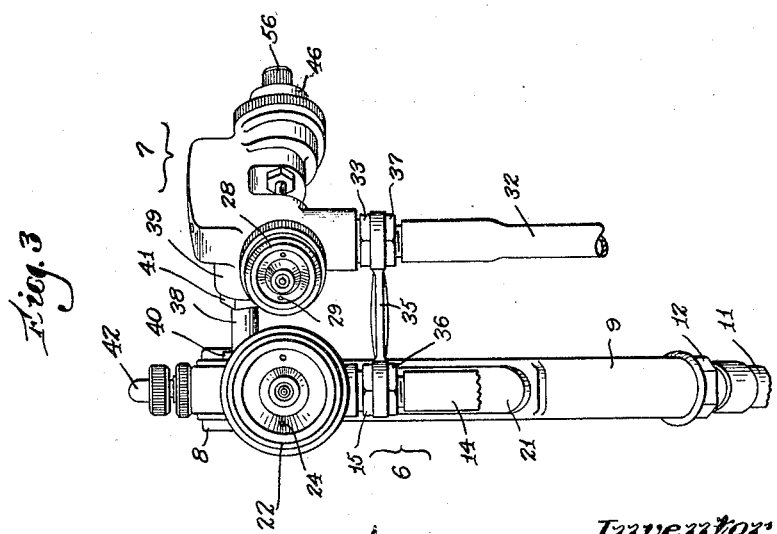

Dec. 9, 1941.  W. B. THOMPSON  2,265,209
TOOL OR APPARATUS FOR APPLYING PROTECTIVE COATING
Filed April 3, 1934  2 Sheets-Sheet 2

Inventor
Wayne B. Thompson
by Charles W. McDermott
his attorney

Patented Dec. 9, 1941

2,265,209

UNITED STATES PATENT OFFICE 2,265,209

TOOL OR APPARATUS FOR APPLYING PROTECTIVE COATING

Wayne B. Thompson, Winchester, Mass., assignor to Spray Engineering Company, Somerville, Mass., a corporation of Massachusetts Application April 3, 1934, Serial No. 718,799

15 Claims. (Cl. 91—45)

The present invention relates to the art of applying coating which is formed just prior to or during application by the coalescence of two compositions, one containing latex and the other containing a latex coagulant, such, for instance, as acetic acid. More particularly the present invention relates to apparatus or tools for producing and applying this type of coating.

It has been proposed heretofore to produce and apply this type of coating through the use of two spray guns, one of which was controlled by a trigger to spray the latex constituent of the coating towards the work to be coated, and the other one of which was controlled by a second trigger to spray the latex coagulant constituent of the coating into the path of the spray of latex constituent before it reached the work to be coated. In some classes of work, such, for instance, as the application of this type of coating to the uppers of shoes to protect them from becoming soiled or injured during the subsequent shoemaking operations, it is necessary that the protective coating be removable from the finished shoes in a safe and easy manner. If any of the latex is applied to the upper in an uncoagulated condition the upper may be ruined because of the adherence of the latex thereto. This condition is not readily discernible, and, in consequence, all the subsequent shoe making operations may be performed before it is discovered that the bond between the latex and the upper prevents the coating from being stripped from the finished shoe. To obviate this difficulty it was found necessary heretofore to manipulate the triggers of the two spray guns in a predetermined order both at the start and at the finish of the coating producing and applying operations, the finishing order being the reverse of the starting order, in an endeavor to have the flow of the latex coagulant begin before and continue after that of the latex. That is, it was necessary, at the start, to pull the trigger of the latex coagulant spray gun to start it spraying before the trigger of the latex spray gun was pulled to start it spraying and, at the finish, to release the trigger of the last named gun before releasing the trigger of the first named gun. This requirement rendered impracticable apparatus for producing and forming the protective coating comprising two spray guns, each controlled independently by a trigger.

The principal object of the present invention is to produce a tool or apparatus by which the spraying of the different constituents of the coating may be controlled in a practicable manner.

To the accomplishment of this object, and such others as may appear hereinafter, the various features of the present invention relate to certain devices, combinations and arrangements of parts hereinafter described and then set forth broadly and in detail in the appended claims which possess advantages which will be apparent to those skilled in the art.

The various features of the present invention will be readily understood from an inspection of the accompanying drawings illustrating the best form of the invention at present devised, in which Figure 1 is a view in plan;

Fig. 2 is a view in left side elevation;

Fig. 3 is a view in front elevation;

Figure 4:
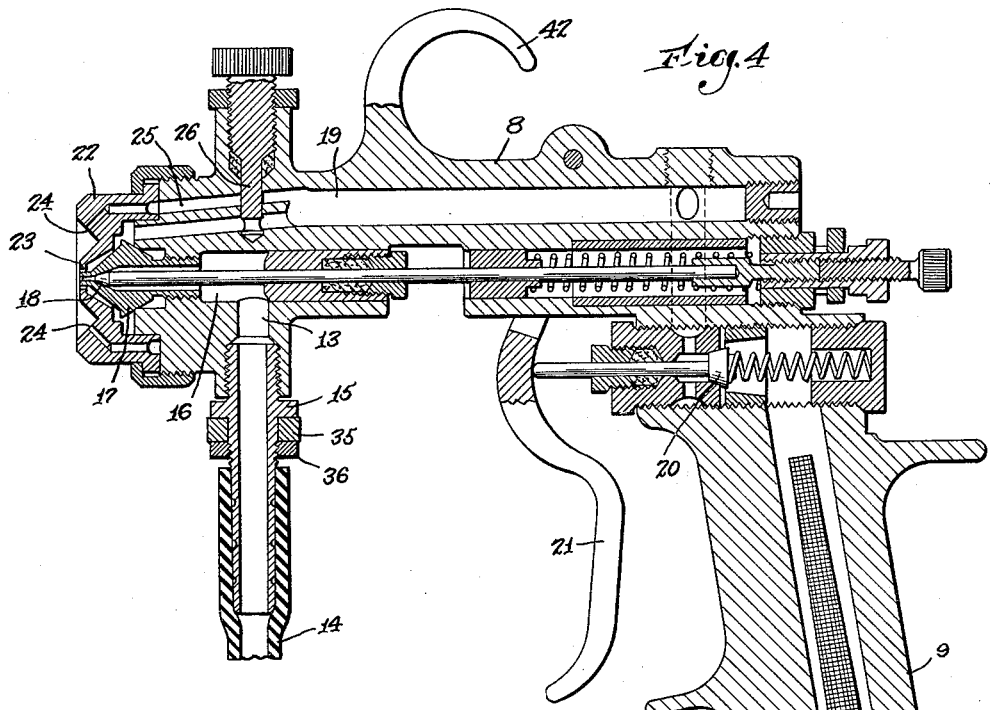
Figure 5:
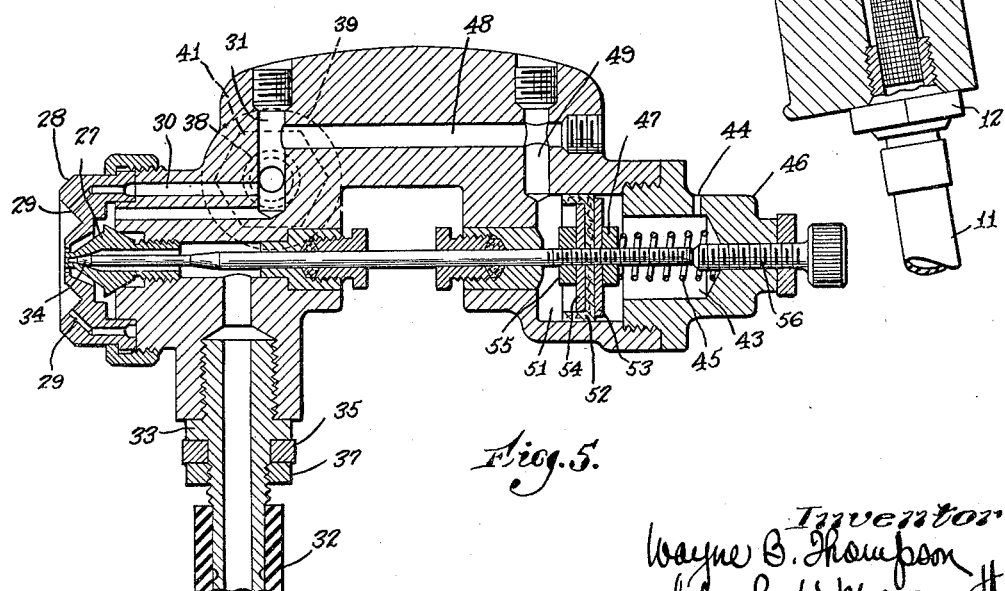

Fig. 4 is an enlarged view in sectional elevation on the line 4—4, Fig. 1, the outer nozzle, however, having been rotated through 90° to show to better advantage the supplemental air jet passages, and Fig. 5 is an enlarged view in sectional elevation on the line 5—5, Fig. 1, the outer nozzle, however, having been rotated through 90° to show to better advantage the supplemental air jet passages.

In the illustrated embodiment of the present invention the apparatus or tool for applying a protective coating comprises a spray gun 6 (Figs. 1, 2 and 3) which sprays the latex constituent of the protective coating and a smaller spray gun 7 which sprays the latex coagulating constituent of the protective coating. As described more in detail hereinafter, the spray gun 7 is supported from the spray gun 6. The spray gun 7 is reduced in size, compared to the size of the spray gun 6, as the amount of the acetic acid composition required to coagulate the latex composition sprayed by the spray gun 6 is relatively small. This construction produces a light and compact tool adapted to be supported and controlled by one hand.

The spray gun 6 has a construction and mode of operation similar to the one disclosed in Patent Numbered 1,819,117 and dated August 18, 1931, certain substitutions of construction materials having been made to resist the corrosive action of latex. Generally the spray gun 6 is provided with a body portion 8 which has integral therewith a hand grip 9. The motive agent, which may be air under pressure, is introduced into the body portion 8 through the hand grip 9 and for that purpose an air passage 10 (Fig. 4) is connected to an air-hose 11 through an air-hose coupling 12 fitted into the lower end of the passage 10.

The latex constituent of the protective coating is introduced into the body portion 8 and for that purpose a passage 13 therein is connected to a latex material hose 14 through an adapter 15 fitted into the lower end of the passage 13. The latex material flows into a chamber 16 from which the material is discharged through an inner nozzle 17. The flow of the material out of the inner nozzle 17 is controlled by a needle valve 18 the front end of which may have a construction and may cooperate with the adjacent surface of the inner nozzle 17 in the manner illustrated and described in Patent Numbered 1,706,006 and dated March 19, 1929.

The motive agent in the passage 10 passes into the main motive agent passage 19 through a valve 20. As explained in detail in Patent No. 1,819,117, the material valve 18 and the air valve 20 are both controlled from a trigger 21 pivotally mounted on the body portion 8, the connections being such that manipulation of the trigger 21 opens the air valve 20 before the material valve 18 is opened and closes the air valve 20 after the material valve 18 has been closed.

As usual in this type of spray gun the outer nozzle 22 is provided with a central discharge orifice 23 surrounding the cylindrical tip of the inner nozzle 17 through which the latex constituent of the protective coating is sprayed into the atmosphere. The main discharge is flattened into a fan-like spray by supplemental air jets issuing from supplemental air jet passages 24 formed in the outer nozzle 22 and communicating with the main motive agent passage 19 through a supplemental motive agent passage 25 controlled by a valve 26. The outer nozzle 22 is angularly adjustable upon the front face of the body portion 8 to vary the plane into which the main discharge may be flattened. As shown in Fig. 4 the supplemental air jets discharge in a vertical plane and would therefore flatten the main discharge in a horizontal plane, but this showing is for the purpose of disclosure only, as in practice the supplemental air jets would be positioned to discharge in a horizontal plane and thus flatten the discharged latex constituent of the protective coating in a vertical plane.

The spray gun 7 for spraying the latex coagulating constituent of the protective coating, so far as the inner nozzle 27, the outer nozzle 28, the supplemental air jet passages 29, the supplemental motive agent passage 30, the main motive agent passage 31, the material hose 32, the adapter 33, and the front end of the needle valve 34 are concerned, has, with the exception of size, substantially the same construction and mode of operation as the spray gun 6. In practice the supplemental air jet passages 29 are arranged in a horizontal plane in order to flatten into a fan-like spray the discharged latex coagulating constituent of the protective coating in a vertical plane.

In order to correlate the spray guns 6 and 7 so that the latex constituent and the latex coagulating constituent of the protective coating, respectively, sprayed thereby may coalesce in the atmosphere prior to the application of the protective coating to the work, the spray guns 6 and 7 are secured together by a brace 35, (Figs. 1, 2 and 3), with the extended longitudinal axes of the guns converging at a point in advance of the discharge orifices of the nozzles 22 and 28. One end of the brace 35 is received by the adapter 15 upon which it is secured by a check-nut 36. The other end of the brace 35 is received by the adapter 33 upon which it is secured by a check-nut 37.

In order to conduct motive agent from the main motive agent passage 19 in the spray gun 6 to the main motive agent passage 31 in the spray gun 7, the spray guns 6 and 7 are connected by a bent nipple 38 (Figs. 1 and 3). One end of the nipple 38 is fitted into an opening, formed in the left-hand side of the spray gun 6, in communication with the main motive agent passage 19. The other end of the nipple 38 is fitted into an opening, formed in a boss 39 on the right-hand side of the spray gun 7, in communication with the main motive agent passage 31. The nipple 38 is secured in position by check-nuts 40 and 41. The nipple 38 is interposed between the left-hand and right-hand sides of the spray guns 6 and 7, respectively, in order that the spray gun 6 may be hung by its hook 42 (Figs. 1 and 2) on the right-hand side of a spray booth (not shown).

With this construction the initial pull on the trigger 21 provides the motive agent passages 19 and 31 in the guns 6 and 7, respectively, with motive agent. By comparing Figs. 1 and 4 it will be apparent that the juncture between the main motive agent passage 19 and the nipple 38 is in advance of the supplemental motive agent passage 25 in the line of air flow. The supply of motive agent from the spray gun 6 to the spray gun 7 is therefore not affected by manipulation of the valve 26 to vary the shape of the target formed by the discharged latex material.

If the latex coagulating constituent of the protective coating is stored in a receptacle of the so-called suction cup type the spray gun 7 would immediately start spraying as soon as it received motive agent from the spray gun 6 provided the needle valve 34 had been previously adjusted out of valve seat engagement with the inner nozzle 27. Further actuation of the trigger 21 would pull back the needle valve 18 thus starting the spraying of the latex constituent of the protective coating by the spray gun 6.

With this construction and mode of operation the tool is supported in one hand and the desirable spraying sequence between the spray guns 6 and 7 both at the start and at the finish of the coating producing and applying operation is controlled by the trigger 21 through the fingers of the hand on which the tool is supported. Stated in another manner, manipulation of the trigger 21 by the fingers of the hand engaged with the grip 9 starts, respectively, the spray guns 7 and 6 to spray the latex coagulating material and the latex material successively and stops, respectively, the spray guns 6 and 7 at the completion of the coating producing and applying operation successively.

Instead of drawing the latex coagulating constituent into the spray gun 7 from a receptacle of the suction cup type, it is preferred to force the latex coagulating constituent into the spray gun either under pressure or by gravity. To accomplish this, however, it is necessary to maintain the needle valve 34 in a normally closed position. To this end the spray gun 7 is provided with a spring chamber 43 (Fig. 5) which is open to the atmosphere through a vent 44. The spring 45 is coiled around the rear end of the spindle of the needle valve 34. One end of the spring is engaged with a stationary spring housing 46 and the other end of the spring is engaged with a check-nut 47 threaded on the needle valve spindle. The spring 45 maintains the needle valve 34 in a normally closed position, thus preventing leakage of the latex coagulant between operations.

In order to operate the needle valve spindle against the tension of the spring 45 immediately upon the introduction of motive agent into the spray guns 6 and 7, the main motive agent passage 31 is connected by a horizontal passage 48 and a vertical passage 49 with a cylinder 51 provided with a piston 52.

The piston 52 comprises a leather cup having its outside and inside faces engaged respectively with metal discs 53 and 54 loosely mounted axially on the needle valve spindle. The piston 52 is clamped between the discs 53 and 54 by the check-nut 47, engaged with the disc 53, and a similar check-nut 55, threaded on the needle valve spindle and engaged with the disc 54. As shown in Fig. 5 movement of the needle valve spindle under the influence of the piston 52 is limited by an adjustable stop screw 56 carried by the spring housing 46.

In its broader aspects the invention contemplates the introduction of the latex coagulant into the spray gun 7 under a suction feed arrangement, that is, induction due to the creation of a condition of unbalanced pressure whereby atmospheric air acting upon the surface of the latex coagulant in its receptacle forces the latex coagulant into the sphere of influence of the motive agent discharged from the nozzle 22. With this mode of operation there may be employed a needle valve stationary in operation but adjustable into a normally open position, as mentioned above. The herein disclosed piston operated needle valve 34 may also be utilized in suction feed, however, since the motive agent entering the cylinder 51 from the passages 31, 48, and 49 acts on the piston 52 to unseat the needle valve. As well known to those skilled in the art, the flow of latex coagulant through the valve opening fluctuates as the amount of material in the suction feed receptacle dwindles.

Maintaining the needle valve normally closed and operating it by the pressure of motive agent on the piston 52 each time the trigger 21 on the spray gun 6 is pulled enables the spray gun 7 to be provided with the latex coagulant under pressure or gravity head, thus making certain the positive action of the spray gun 7 with respect to the flow of the latex coagulant in immediate response to the pulling of the trigger 21 on the spray gun 6. This construction and mode of operation eliminates not only fluctuation in the flow of the latex coagulant, characteristic of a suction feed, but also uncertainty with respect to the flow of the latex coagulant, as would be the case with improper elevation of its source of supply in a suction feed arrangement.

Nothing herein explained is to be interpreted as limiting the invention in the scope of its application to use in connection with the particular apparatus or the particular mode of operation or both selected for purposes of illustration and explanation. While the particulars of construction herein set forth are well suited to one mechanical form of the invention, it is not limited to these details of construction, nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:

1. In a tool or apparatus for applying a coating, the combination with a first body portion having means to admit a constituent of the coating and a motive agent, a main motive agent passage, constituent and main motive agent valves, and a device for operating the valves; a second body portion having means to admit another constituent of the coating, a connection with the main motive agent passage in the first body portion to receive motive agent therefrom, and a constituent valve; of means whereby motive agent received from the first body portion operates the constituent valve of the second body portion.

2. In a tool or apparatus for applying a coating which comprises different constituents, the combination with a plurality of spray guns each adapted to spray a different one of the constituents and a motive agent and each provided with a constituent valve, only one of said spray guns being provided with a main motive agent valve and only one of said guns being provided with a hand grip, said spray guns being connected together for support by one hand of an operative and in angularly disposed relationship so that the sprayed constituents coalesce, of a single operating means, adjacent the grip so that it may be actuated by the hand that supports the guns, for controlling the operation of the constituent valves and the motive agent valve.

3. In a tool or apparatus for applying a coating which comprises different liquid constituents, the combination with a plurality of body portions each having a constituent valve, a discharge nozzle, and means for admitting a motive agent and a different one of the constituents of the coating for discharge through the nozzle, only one of said body portions being provided with a main motive agent valve and only one of said body portions being provided with a hand grip, said body portions being connected together for support by one hand of an operative and in angularly disposed relationship so that the discharged constituents coalesce, of a single operating means, adjacent the grip so that it may be actuated by the hand that supports the body portions, for controlling the operation of the constituent valves and the motive agent valve.

4. In a tool or apparatus for applying a coating which comprises different constituents, the combination with a plurality of spray guns each adapted to spray a different one of the constituents of the coating, said spray guns being disposed angularly to each other so that the sprayed constituents coalesce, each of said guns having means to admit a constituent and a motive agent and being provided with a constituent valve, only one of said guns having a main motive agent valve, of means carried by the last named gun for controlling the operation of the constituent valves and the motive agent valve.

5. In a tool or apparatus for applying a coating which comprises different liquid constituents, the combination with a plurality of body portions, each having a discharge nozzle and means for admitting a motive agent and a different one of the liquid constituents of the coating for discharge through the nozzle, each of said body portions being provided with a constituent valve and only one of said body portions being provided with a main motive agent valve, said body portions including the nozzles being disposed angularly to each other so that the discharged constituents coalesce, of operating means carried by one of the body portions for controlling the operation of the constituent valves and the motive agent valve.

6. A tool or apparatus for applying a coating which comprises different constituents, consisting of a multiple sprayer construction provided with means operable for the discharge of one of the constituents, means operable for the discharge of a different one of the constituents and arranged in converging relation to the first and arranged in converging relation to the first named means so that the constituent discharges coalesce, means operable for the discharge of motive agent to atomize the constituent discharges prior to their coalescing, separate controlling means for each of said aforesaid means, and a single means for effecting the actuation of said controlling means in a predetermined successive order, the motive agent controlling means being actuated first.

7. In a tool or apparatus for applying a coating which comprises different constituents, the combination with means operable for the discharge of one of the constituents, means operable for the discharge of a different one of the constituents and arranged in converging relation to the first named means so that the constituent discharges coalesce, a first constituent valve controlling the first named discharge means, a second constituent valve controlling the second named discharge means, and means operable for the discharge of motive agent to atomize the constituent discharges prior to their coalescing, of a single means for actuating the motive agent discharge means and for thereafter effecting the actuation of the two constituent valves successively so that the first valve is opened prior to the opening of the second valve and so that the second valve is closed prior to the closing of the first valve.

8. In a tool or apparatus for applying a coating which comprises different liquid constituents, the combination with means, including a constituent valve, operable for the discharge of one of the liquid constituents; means including another constituent valve, operable for the discharge of a different one of the liquid constituents; said second discharge means being initially operable only after the initiation of operation of the first discharge means and the two discharge means being arranged in converging relation so that the constituent discharges coalesce; and means, including a motive agent valve, operable for the discharge of motive agent to atomize the constituent discharges prior to their coalescing of a single means controlling the aforesaid constituent valves and motive agent valve for positively insuring maintenance of discharge of said one of the constituents and of motive agent all the time that the second constituent discharge means is in operation.

9. In a tool or apparatus for applying a coating which comprises different liquid constituents, the combination with means operable for the discharge of one of the liquid constituents, means operable for the discharge of a different one of the liquid constituents, said two discharge means being arranged in converging relation so that the constituent discharges coalesce, means for controlling the starting and stopping of the first discharge means, and means initially operable only after the initiation of operation of the first discharge means for controlling the starting and stopping of the second discharge means, of means for discharging motive agent to atomize both of the constituent discharges prior to their coalescing, said means for controlling the starting and stopping of the first discharge means being pneumatically operated by the motive agent, and said means for controlling the starting and stopping of the second discharge means having a lost motion mechanical linkage connection with the means for discharging motive agent.

10. In a tool or apparatus for applying a coating which comprises different liquid constituents, the combination with means operable for the discharge of one of the liquid constituents, means operable for the discharge of a different one of the liquid constituents, said two discharge means being arranged in converging relation so that the constituent discharges coalesce, constituent valve means for controlling the starting and stopping of the first discharge means, constituent valve means for controlling the starting and stopping of the second discharge means, and means for operating said constituent valves in a predetermined successive order so that the second discharge means operates only when the first discharge means is in operation, of means for discharging motive agent to atomize both of the constituent discharges prior to their coalescing, said constituent valve for controlling the starting and stopping of the first discharge means being pneumatically operated by the motive agent, and said constituent valve for controlling the starting and stopping of the second discharge means being operatively connected mechanically to said operating means.

11. In a tool or apparatus for applying a coating which comprises different liquid constituents, the combination with a body portion and coating constituent and motive agent discharge means, including a plurality of convergingly related spray discharge nozzles each adapted to discharge a different one of the liquid constituents and a motive agent and also including a motive agent valve and separate constituent valves, operatively supported from the body portion, of a single means for effecting the actuation of all of the valves in a predetermined successive order.

12. In a tool or apparatus for applying a coating which comprises different liquid constituents, the combination with a body portion, discharge means provided with a plurality of discharge orifices, said discharge means having a separate control valve for each different constituent and being operatively associated with said body portion and constructed and arranged for the discharge from each of said orifices of motive agent and a different one of the liquid constituents of the coating, said orifices being convergingly related so that the discharged constituents coalesce, and a single means for effecting the actuation of the constituent valves in a predetermined successive order, of means operatively dependent on said single means for discharging motive agent through said orifices to atomize the different constituent discharges prior to their coalescing.

13. In a tool or apparatus for applying a coating, the combination with a first body portion having means to admit a constituent of the coating and a motive agent, a main motive agent passage, and constituent and main motive agent valves; a second body portion having means to admit another constituent of the coating, a connection with the main motive agent passage in the first body portion to receive motive agent therefrom, a constituent valve, and means whereby motive agent received from the first body portion operates the constituent valve of the second body portion; of means for operating the main motive agent valve of the first body portion so that the second body portion may receive motive agent therefrom, said operating means being operatively connected to the constituent valve of the first body portion in such manner as to initiate its operation only after the initiation of operation of said main motive agent valve and of the constituent valve of the second body portion.

14. In a tool or apparatus for applying a coating, the combination with a first body portion having means to admit a constituent of the coating and a motive agent, a main motive agent passage, constituent and main motive agent valves, a device for operating the valves, and means operatively connected to the main motive agent passage to receive motive agent therefrom and project it against the discharge from the body portion to form said discharge into a fan-like spray; a second body portion having means to admit another constituent of the coating, a connection with the main motive agent passage in the first body portion to receive motive agent therefrom, a constituent valve, and means operatively connected to said connection to receive motive agent from the main motive agent passage of the first body portion and project said motive agent against the discharge from the second body portion to form the discharge therefrom into a fan-like spray; said body portions being arranged so that the fan-like spray discharges therefrom merge in substantially a singe flat stream; of means whereby motive agent received from the first body portion operates the constituent valve of the second body portion.

15. In a tool or apparatus for applying a coating, the combination with a first body portion having means to admit a constituent of the coating and a motive agent, a main motive agent passage, constituent and main motive agent valves, and means operatively connected to the main motive agent passage to receive motive agent therefrom and project it against the discharge from the body portion to form said discharge into a fan-like spray; a second body portion having means to admit another constituent of the coating, a connection with the main motive agent passage in the first body portion to receive motive agent therefrom, a constituent valve, means whereby motive agent received from the first body portion operates the constituent valve of the second body portion, and means operatively connected to said connection to receive motive agent from the main motive agent passage of the first body portion and project said motive agent against the discharge from the second body portion to form the discharge therefrom into a fan-like spray; said body portions being arranged so that the fan-like spray discharges therefrom merge in substantially a single flat stream; of means for operating the main motive agent valve of the first body portion so that the second body portion may receive motive agent therefrom, said last named means being operatively connected to the constituent valve of the first body portion in such manner as to initiate its operation only after the initiation of operation of said main motive agent valve and of the constituent valve of the second body portion.

WAYNE B. THOMPSON.